(12) United States Patent
LeClerg

(10) Patent No.: US 6,857,041 B2
(45) Date of Patent: Feb. 15, 2005

(54) METHOD AND APPARATUS PROVIDING AN INTERFACE TO ALLOW PHYSICAL MEMORY TO BE INITIALIZED USING FIRMWARE/HARDWARE METHODS

(75) Inventor: Frank E. LeClerg, Columbia, SC (US)

(73) Assignee: Intel Corporation, Santa Clara, CA (US)

( * ) Notice: Subject to any disclaimer, the term of this patent is extended or adjusted under 35 U.S.C. 154(b) by 181 days.

(21) Appl. No.: 10/113,207

(22) Filed: Mar. 29, 2002

(65) Prior Publication Data

US 2003/0185058 A1 Oct. 2, 2003

(51) Int. Cl.$^7$ ............................................. G06F 12/00
(52) U.S. Cl. ...................... 711/103; 711/105; 711/166
(58) Field of Search ................................. 711/166, 170, 711/102–105; 709/223–224; 713/1–2

(56) References Cited

U.S. PATENT DOCUMENTS

| | | | |
|---|---|---|---|
| 6,463,512 B2 * | 10/2002 | Isemura et al. ............. 711/160 |
| 6,647,503 B1 * | 11/2003 | Kuroda ........................ 713/322 |
| 2001/0049765 A1 * | 12/2001 | Matsuura et al. ........... 711/103 |
| 2003/0018892 A1 * | 1/2003 | Telio ........................... 713/164 |
| 2003/0033397 A1 * | 2/2003 | Gurumoorthy et al. ..... 709/223 |
| 2003/0135785 A1 * | 7/2003 | Carr ............................ 714/25 |

* cited by examiner

Primary Examiner—Matthew Kim
Assistant Examiner—Shane Thomas
(74) Attorney, Agent, or Firm—Pillsbury Winthrop LLP

(57) ABSTRACT

A system to initialize a memory device. An operating system executes an application program. A memory device has a plurality of memory addresses that hold data. A firmware device holds settings for the memory device and sends a completion signal to the operating system only after an initialization of the memory device has been completed in response to an initialization request being received from the operating system. A memory controller initializes a range of the memory addresses to a configurable value after receiving the initialization request from the firmware device, and sends the completion signal to the firmware device after the initialization is completed.

21 Claims, 5 Drawing Sheets

METHOD AND APPARATUS PROVIDING AN INTERFACE TO ALLOW PHYSICAL MEMORY TO BE INITIALIZED USING FIRMWARE/HARDWARE METHODS

BACKGROUND OF THE INVENTION

1. Field of the Invention

This invention relates to the field of memory initialization, and more specifically, to a system, method, and apparatus to provide an interface between an operating system and a memory controller to allow the initialization of memory.

2. Background of the Invention

Computing systems typically include at least an operating system and a memory such as a Dynamic Random Access Memory (DRAM). The memory stores data in "memory addresses" contained therein. Each "memory address" is the memory location of the memory corresponding to the address. Each memory address may store several bits of data.

Because the data typically remains at a memory location until overwritten, security issues arise. For example, if a user's credit card number or password had been used by a prior application program, that information can reside in a memory location of the memory device until the data at that memory address is overwritten. Accordingly, someone with access to the operating system and the memory device could retrieve the sensitive information from the memory. Therefore, it is sometimes necessary to initialize sections of the memory device before granting the operating system, or applications executed by the operating system, access to them.

Typical initialization programs in the art utilize an operating system kernel of the operating system to initialize the memory addresses of the memory device. Such programs typically utilize the operating system to cause the processor to execute a series of successive initialization cycles on the memory device. Each initialization cycle is used to initialize an area of the memory representing a memory address. After each initialization cycle is completed a hardware-based "success" signal is sent back to the operating system to indicate that the location of the memory representing the memory address has been initialized. The operating system kernel then sends another initialization cycle to initialize the area of the memory representing the next memory address. The process is repeated until the required section of the memory has been initialized.

Such a method is inefficient, however, because the operating system continually receives "success" signals and sends the initialization cycles until the required section of the memory has been initialized. Therefore, much of the processing bandwidth of the operating system must be used for the initialization, and any other application programs executed by the operating system slow down.

Accordingly, current memory initialization systems are deficient because an operating system controls initialization of memory and receives continuous initialization information during the initialization process, using much processing bandwidth.

DETAILED DESCRIPTION

An embodiment of the present invention provides an interface between an operating system and a controller that may be utilized to initialize a memory device or a set of memory devices. An application program executed by the operating system may require a block of memory, causing the operating system to request a section of the memory device be initialized by sending a signal to system firmware. The system firmware may then access the memory device directly, based upon existing knowledge of the operation of a memory controller, to determine the settings of the memory device. Once the settings are known, the firmware may cause the controller to initialize a section, or all sections, of the memory device. After initializing appropriate sections of the memory device, the controller may then inform the firmware that the initialization process is complete. Alternatively, the firmware may initialize a section, or all sections, of the memory device upon system boot-up by having the controller directly access the memory device. After the memory device has been initialized during system boot-up, the system firmware may cause the operating system to load.

Figure 1:
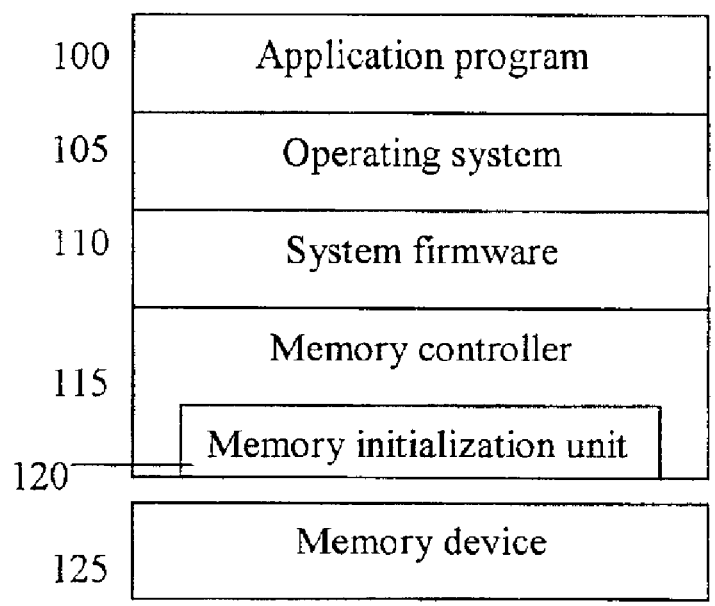
FIG. 1 illustrates a system level diagram according to an embodiment of the invention.

FIG. 1 illustrates a system level diagram according to an embodiment of the invention. At the highest level, an application program 100 is executed by an operating system 105. The application program 100 may be any data entry, update, query or report program that processes data for the user. It includes the generic productivity software (spreadsheets, word processors, database programs, etc.) as well as custom and packaged programs for payroll, billing, inventory and other accounting purposes, for example. The operating system 105 is the master control program that runs the computer. The first program loaded when the computer is turned on, its main part, the operating system 105 "kernel," resides in a memory at all times. The operating system 105 sets the standards for all application programs 100 that run in a computing device. The application program 100 may "talk to" (i.e., communicate data with) the operating system 105 for user interface and file management operations. Also called an "executive" or "supervisor," an operating system 105 may perform some, or all, of the following functions: (1) providing a user interface, (2) job management, (3) task management, (4) data management, (5) device management, and (6) security.

Beneath the operating system 105 is the system firmware 110. The system firmware 110 may be stored within a memory chip that holds its content without electrical power, such as a Read Only Memory (ROM), a Programmable Read Only Memory (PROM), an Erasable Programmable Read Only Memory (EPROM), or an Electrically Erasable Programmable Read Only Memory (EEPROM). The system firmware 110 may contain the Basic Input Output System (BIOS) routines of a computing device. The BIOS may contain information such as the settings for a hard disk drive, or a memory, for example. The settings may include information such as the names of address registers in the memory, and which bus or which protocols may be used to communicate data with the hard disk drive or memory. The system firmware 110 may have an Extensible Firmware Interface (EFI) format.

A memory controller 115 is a particular hardware component that lies beneath the layer of the system firmware 110. The memory controller 115 may be a processing unit, for example, utilized to perform various tasks such as initializing a memory, or performing reads and writes to a memory device 125. In other embodiments, multiple memory devices 125 may be utilized. The memory controller 115 may include a memory initialization unit 120, which may be utilized to initialize the memory device 125. The memory device 125 may be a Dynamic Random Access Memory (DRAM), or Static Random Access Memory (SRAM), for example.

An embodiment of the invention provides an interface so that memory controller 115 may initialize a section of the memory 125 without having to send a signal back to the operating system 105 after each individual memory address of the memory device 125 has been initialized. During an initialization process, all of the memory addresses in the memory device 125 that are to be initialized may be set to "0," for example. If each address in the memory device 125 holds "32" bits, each of the initialized bits may be set to "0" so that an initialized memory address holds the value "zero." In alternative embodiments, each initialized bit may be set to "1" so that each address holds the value "all-ones." In additional embodiments, the memory addresses may be initialized to hold any other suitable values. In other embodiments, each memory address may also hold a data value having more or fewer than "32" bits.

To initialize the memory device 125, the operating system 105 may send a request to the system firmware 110 to inform that a section of memory of the memory device 125 needs to be initialized. The system firmware 110 may then determine the settings and memory mapping of the memory device 125 by accessing programmed knowledge of the memory controller 115, and may then may cause the memory initialization unit 120 of the memory controller 115 to initialize the desired section of the memory device 125. The initialization process may be done location-by-location (e.g., one memory address at a time). The memory controller 115 may access the memory device 125 and initialize the first memory address. Once initialized, a "success" signal may be sent back to the memory initialization unit 120. The next memory address may then be initialized. The process may be repeated until all appropriate memory addresses have been initialized. Once the required section of the memory device 125 has been successfully initialized, the memory controller 115 may then send a signal back to the operating system 105 by way of the system firmware 110 to inform that the memory device 125, or sections thereof, has been successfully initialized.

Accordingly, in an embodiment of the invention, the operating system 105 may cause the memory device 125 to be initialized without even having the settings for the memory device 125. In other words, the operating system 105 need not know the settings of the memory device 125, or even what the memory device 125 is, or whether there is more than one memory device 125. Instead, the operating system 105 may send an initialization request to the system firmware 110, which may carry out the initialization process via memory controller 115. First, the system firmware 110 may acquire the settings of memory device 125 from the memory controller 115, and may then cause the memory controller to perform the initialization process. Once complete, the system firmware 110 may send a signal back to the operating system 105 to inform of the successful initialization.

Memory initialization may be useful for security purposes. For example, if a file sharing program is to be executed on a memory device 125 to share files with other computing devices, it is important that the other computing devices not be able to acquire passwords or other sensitive information that may be stored within the memory device 125.

Figure 2A:
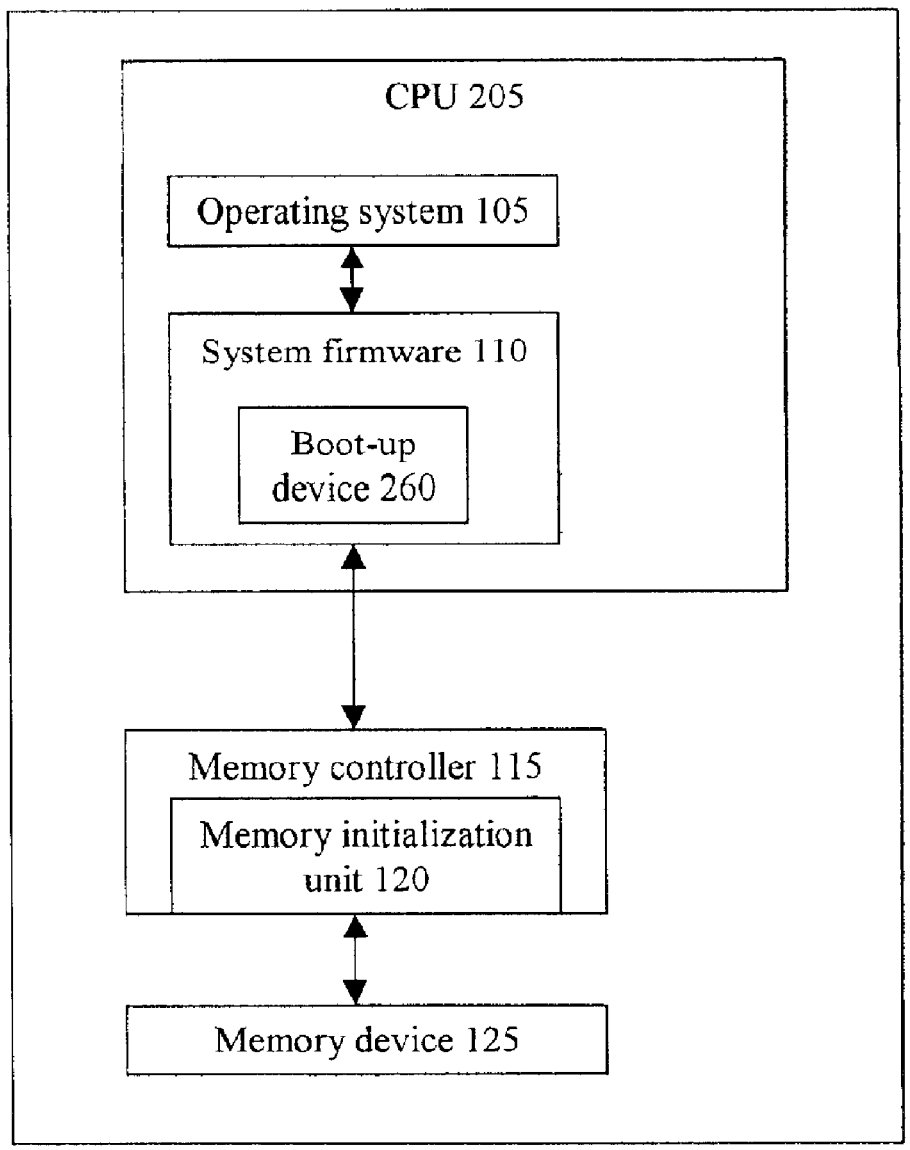
FIG. 2A illustrates a single computing device having an operating system, a memory controller, and a memory device according to an embodiment of the invention.

FIG. 2A illustrates a single computing device 200 having an operating system 105, a memory controller 115, and a memory device 125 according to an embodiment of the invention. As illustrated, the operating system 105, the memory controller 115 and the memory initialization unit 120, the memory device 125, and the system firmware 110, and the Central Processing Unit (CPU) 205 may all reside within a single computing device 200. The computing device 200 may be a personal computer, a calculator, or a Personal Digital Assistant (PDA), for example. In such an embodiment, the operating system 105 may be Microsoft Windows, Linux, or any other suitable operating system. The system firmware 110 may be contained within a chip on a motherboard, for example. In other embodiments, a motherboard may not be necessary. As discussed above, the memory device 125 may be a DRAM, an SRAM, or any other suitable memory having a plurality of memory addresses to hold bits of data. The memory controller 115 may be a processing unit that is separate from the CPU 205 of the computing device 200. The operating system 105 and the system firmware 110 may both operate through use of the CPU 205, as shown. The system firmware 110 may include a boot-up device 260 to allow the operating system 110 to load during system boot-up. For example, it may be necessary to initialize the memory device 125, or sections thereof, prior to loading the operating system 105. Accordingly, once a computing device is turned "on" and the system begins to boot-up, the system firmware 110 may send an "initialization request" to the memory controller requesting that the memory device 125 be initialized. The memory initialization unit 120 of the memory controller 115 may then initialize the memory device 125 and, upon completion, may send a "completion signal" to the system firmware 110. A boot-up device 260 of the system firmware 110 may then cause the system to continue with boot-up, during which the operating system 110 may be loaded into the CPU.

Figure 2B:
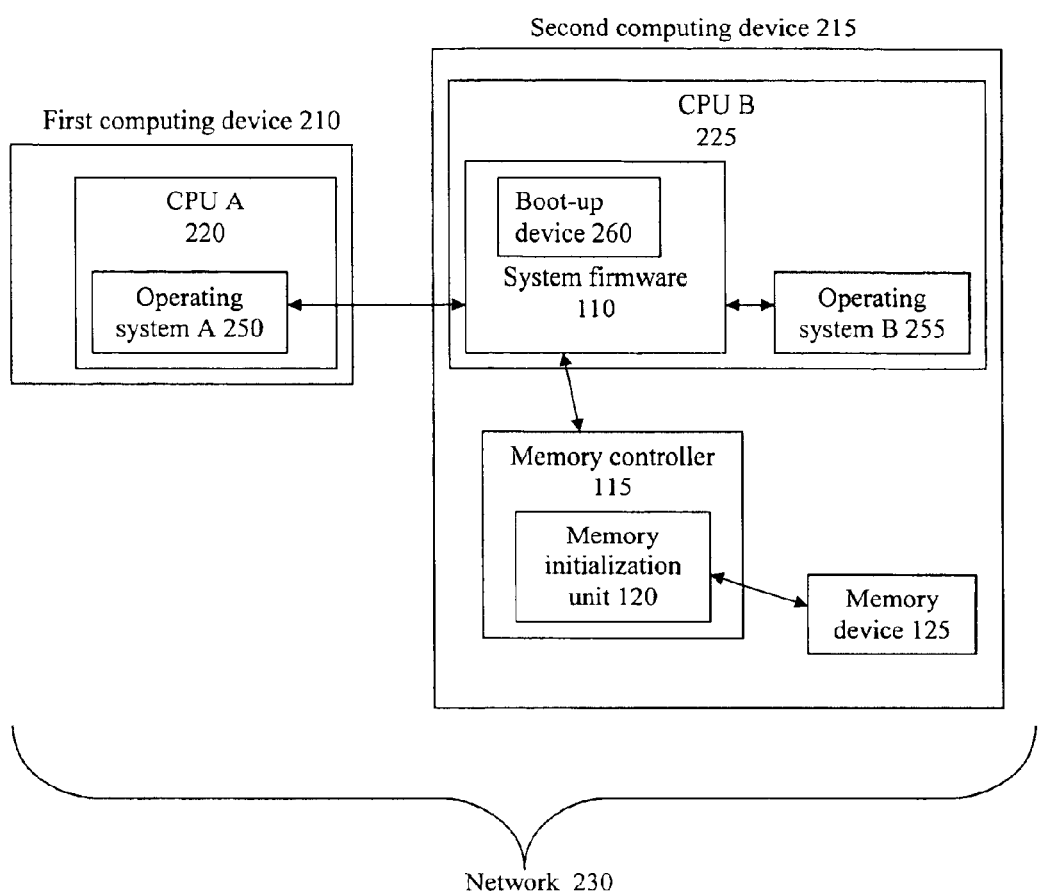
FIG. 2B illustrates two computing devices (i.e., computing device A and computing device B) each having their own operating systems (i.e., operating system A and operating system B) and a shared memory device according to an embodiment of the invention.

FIG. 2B illustrates two computing devices (i.e., computing device A 210 and computing device B 215) each having their own operating systems (i.e., operating system A 250 and operating system B 255) and a shared memory device 125 according to an embodiment of the invention. As illustrated, in the embodiment, the first computing device 210 is physically separate from the second computing device 215. The first computing device 210 and the second computing device 215 maybe located on a network 230, for example. The network 230 may be a Local Area Network (LAN), a Wide Area Network (WAN), or any other suitable type of network. In other embodiments, the first computing device 210 and the second computing device 215 may be directly connected to each other, rather than through a network 230. The first computing device 210 may be a personal computer, and the second computing device 215 may be a separate computer utilized during the execution of large application programs 100, for example. In other embodiments, the first 210 and the second 215 computing devices may be calculators, PDAs, or any other suitable computing devices. Operating system A 220 may be executed within the first computing device 210 by the CPU A 220. The memory device 125 may be located in the second computing device 215 along with system firmware 110, a memory controller 115 and a memory initialization unit 120, as well as CPU B 225. As shown, the system firmware 110 and the operating system B 255 may both operate through use of CPU B 225. In other embodiments, CPU B 225 may not be necessary, and the system firmware 110, the memory controller 115, and the memory initialization unit 120 need not all be located with the second computing device 215.

To initialize the memory device 125, the operating system 105 may send a signal to the memory controller 115 by way of the system firmware 110 requesting that all or a section of the memory device 125 be initialized. The memory initialization unit 120 of the memory controller 115 may then be used to initialize the memory device 125 from the system firmware 110, and may initialize the appropriate section of the memory device 125. In other embodiments, more than one memory device 125 may be utilized. When completed, the memory controller 115 may send a signal back to the operating system 105 by way of the system firmware 110 to inform that the requested section, or sections, of the memory device 125 have been successfully initialized. In some embodiments, the operation of the memory controller 115 may be controlled by the CPU B 225. In other embodiments, the CPU B 225 may not be necessary. As discussed above with respect to FIG. 2A, the system firmware 110 may also include a boot-up device 260 to allow the system to load the operating system 105 during system boot-up after the memory device 125 has been initialized.

Figure 3:
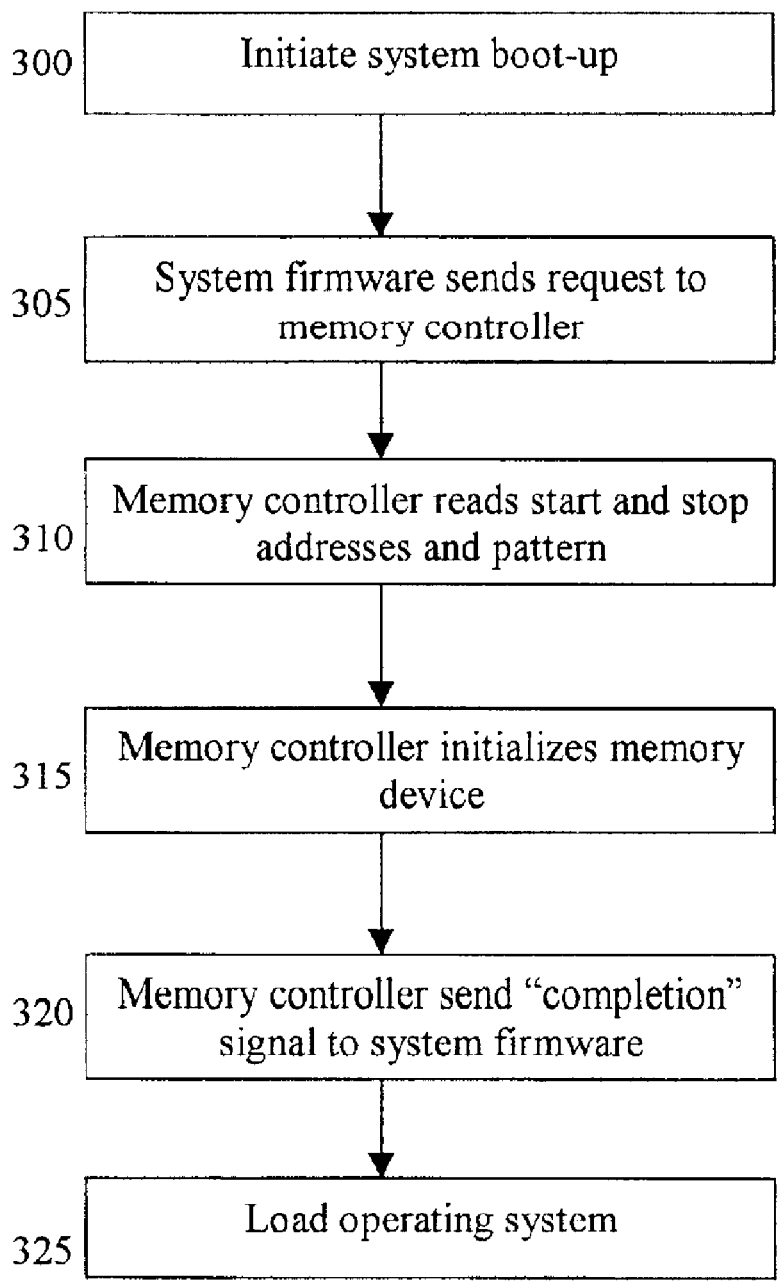
FIG. 3 illustrates a method of initializing a memory device during system boot-up according to an embodiment of the invention.

FIG. 3 illustrates a method of initializing a memory device 125 during system boot-up according to an embodiment of the invention. As described above, the operating system 105 system firmware 110 may initiate the initialization of the memory device 125 by sending a signal to the memory controller 115. However, in other embodiments, the memory device 125, or sections thereof, may be initialized upon system boot-up request by the operating system 105. Such a function may be desirable, for example, if multiple users utilize computing device 130 having the operating system 105 and the memory device 125. Accordingly, to ensure that a user cannot recover a previous user's passwords or other sensitive information from the memory device 125, the memory device 125 may be initialized upon system boot-up. First, the system begins 300 to boot-up. Next, the system firmware 110 may send 305 a signal to the memory controller 115 to instruct the memory controller 115 to initialize all of, or a section of, the memory device 125. The memory controller 115 may then read 310 the start and end addresses and selected data pattern to be initialized from the system firmware 110. Next, the memory controller 115 may initialize 315 the appropriate memory addresses in the memory device 125 through the use of the memory initialization unit 120. Finally, a "success" signal may be sent 320 to the system firmware 110 to indicate that the initialization is complete. After the success signal has been sent, the operating system is loaded 325.

Figure 4:
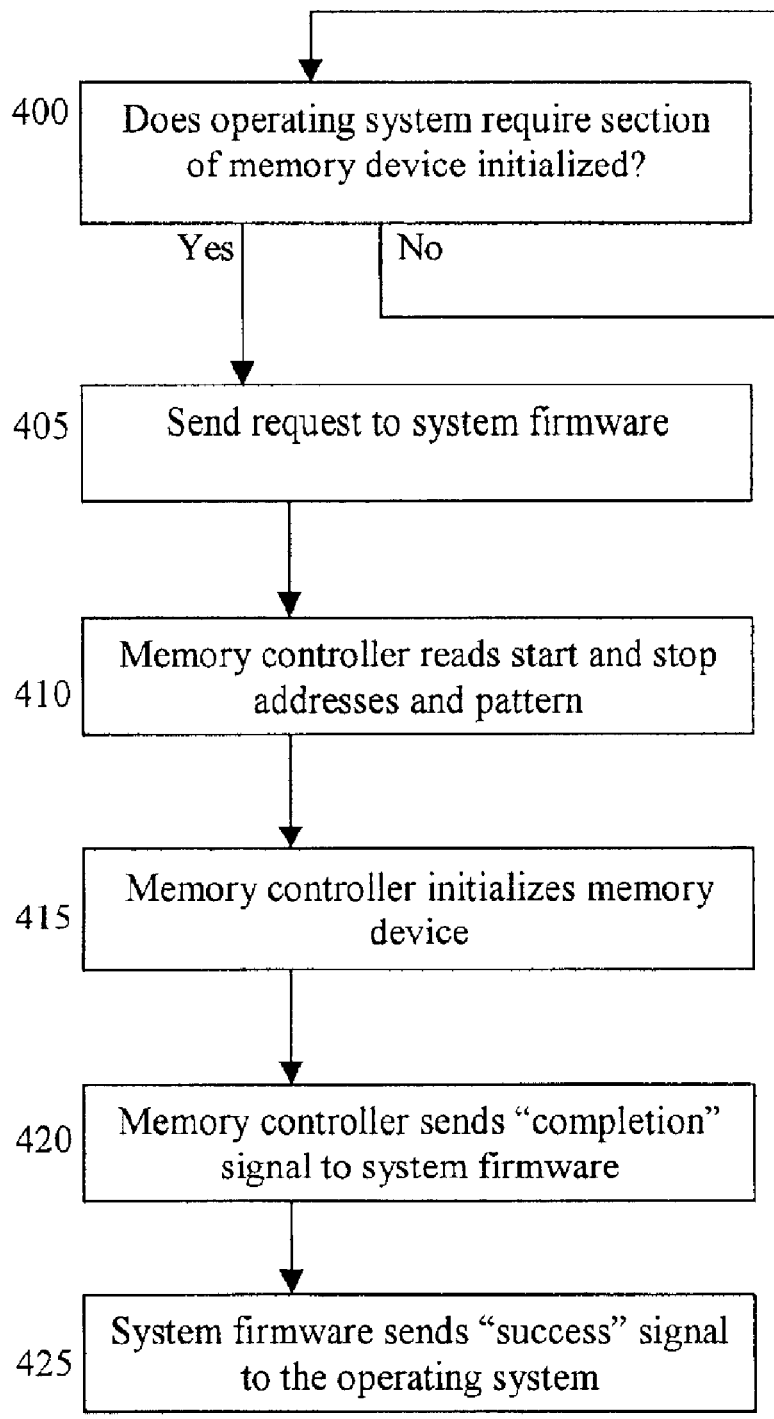
FIG. 4 illustrates a method to allow the operating system to initiate the initialization of the memory device according to an embodiment of the invention.

FIG. 4 illustrates a method to allow the operating system 105 to initiate the initialization of the memory device 125 according to an embodiment of the invention. First, the system determines 400 whether the operating system 105 requires a section of the memory device 125 to be initialized. If "no," processing remains at step 400. If "yes," processing continues to step 405 where the system sends 405 a signal request to the memory controller 115 by way of the system firmware 110 to initiate the initialization process. Next, the memory controller 115 acquires 410 the start and stop memory addresses and the selected data patterns to be initialized from the system firmware 110. The system may be configured so that the operating system 105 can simply request that a "32" kilobit (kb) section of the memory device 125 can be initialized, for example. The memory initialization unit 120 of the memory controller 115 may then initialize 415 the requisite section of the memory device 125. Once the initialization is successfully completed, a "completion" signal is sent 420 back to the system firmware 110. Finally, the system firmware 100 may send 425 the "success" signal to the operating system 105 to inform of the successful initialization.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An initialization system, comprising:
   a memory to hold data, wherein the memory has a plurality of memory addresses;
   an operating system to execute an application program, the operating system requesting a range of memory addresses to be initialized;
   a firmware device, to hold settings for the memory, and send a completion signal to the operating system after an initialization of the memory has been completed in response to an initialization request being received from the operating system; and
   a memory controller to initialize the range of the memory addresses to a configurable value after receiving the initialization request from the firmware device, and send the completion signal to the firmware device after the initialization is completed,
   wherein the firmware device is physically separate from the memory controller and the memory, and the memory is a Dynamic Random Access Memory (DRAM).

2. The system of claim 1, wherein the firmware device has an Extensible Firmware Interface (EFI) format.

3. The system of claim 1, wherein the operating system and the memory are housed within a common computing device.

4. The system of claim 1, wherein the operating system is housed within a first computing device and the memory is housed within a second computing device.

5. The system of claim 4, wherein the first computing device and the second computing device are connected via a network.

6. An initialization system, comprising:
   a memory to hold data, wherein the memory has a plurality of memory addresses;
   an operating system to execute an application program, the operating system requesting a range of memory addresses to initialized;
   a firmware device, to hold settings for the memory, and send a completion signal to the operating system after an initialization of the memory has been completed in response to an initialization request being received from the operating system; and a memory controller to initialize the range of the memory addresses to a configurable value after receiving the initialization request from the firmware device, and send the completion signal to the firmware device after the initialization is complete, wherein the firmware device is physically separated from the memory controller and the memory, and the memory is a Static Random Access Memory (SRAM).

7. An initialization system, comprising:

a memory to hold data, wherein the memory has a plurality of memory addresses;

an operating system to execute an application program, the operating system requesting a range of memory addresses to be initialized;

a firmware device, to hold settings for the memory, and send a completion signal to the operating system after an initialization of the memory has been completed in response to an initialization request being received from the operating system; and a memory controller to initialize the range of the memory addresses to a configurable value after receiving the initialization request from the firmware device, and send the completion signal to the firmware device after the initialization is completed, wherein the firmware device is physically separate from the memory controller and the memory, and the settings include a memory address mapping.

8. A method to provide an interface to allow initialization, comprising:

sending a request to a memory controller to initiate an initialization process for a range of memory addresses of a memory by a firmware device which is physically separate from the memory controller and the memory;

acquiring settings of the memory by the firmware device;

initializing the range of memory addresses to a configurable value; and sending a completion signal to an operating system from the firmware device only upon completion of the initialization process, in response to an initialization request being received from an application program executing within the operating system, wherein the settings include a memory address mapping.

9. The method of claim 8, wherein the settings are stored within the firmware device.

10. The method of claim 9, wherein the firmware device has an Extensible Firmware Interface (EFI) format.

11. A method to provide an interface to allow initialization, comprising:

sending a request to a memory controller to initiate an initialization process for a range of memory addresses of a memory by a firmware device which is physically separate from the memory controller and the memory;

acquiring settings of the memory by the firmware device;

initializing the range of memory addresses to a configurable value; and sending a completion signal to an operating system from the firmware device only upon completion of the initialization process, in response to an initialization request being received from an application program executing within the operating system, wherein the memory is a Dynamic Random Access Memory (DRAM).

12. A method to provide an interface to allow initialization, comprising:

sending a request to a memory controller to initiate an initialization process for a range of memory addresses of a memory by a firmware device which is physically separate from the memory controller and the memory;

acquiring settings of the memory by the firmware device;

initializing the range of memory addresses to a configurable value; and sending a completion signal to an operating system from the firmware device only upon completion of the initialization process, in response to an initialization request being received from an application program executing within the operating system, wherein the memory is a Static Random Access Memory (SRAM).

13. A machine code storage device, comprising:

a machine-readable medium; and machine-readable code, stored on the machine-readable medium, having instructions, which when executed cause a machine to receive a request to initiate an initialization process for a range of memory addresses of a memory at a firmware device which is physically separate from a memory controller and the memory, acquire settings of the memory device by the firmware device, initialize the range of memory addresses to a configurable value, and send a completion signal to an operating system from the firmware device only upon completion of the initialization process, in response to an initialization request being received from an application program executing within the operating system, wherein the settings include a memory address mapping.

14. The machine code storage device of claim 13, wherein the settings are stored within the firmware device.

15. The machine code storage device of claim 14, wherein the firmware device has an Extensible Firmware Interface (EFI) format.

16. A machine code storage device, comprising:

a machine-readable medium; and machine-readable code, stored on the machine-readable medium, having instructions, which when executed cause a machine to receive a request to initiate an initialization process for a range of memory addresses of a memory at a firmware device which is physically separate from a memory controller and the memory, acquire settings of the memory device by the firmware device, initialize the range of memory addresses to a configurable value, and send a completion signal to an operating system from the firmware device only upon completion of the initialization process, in response to an initialization request being received from an application program executing within the operating system, wherein the memory is a Dynamic Random Access Memory (DRAM).

17. A machine code storage device, comprising:

a machine-readable medium; and machine-readable code, stored on the machine-readable medium, having instructions, which when executed cause a machine to receive a request to initiate an initialization process for a range of memory addresses of a memory at a firmware device which is physically separate from a memory controller and the memory, acquire settings of the memory device by the firmware device, initialize the range of memory addresses to a configurable value, and send a completion signal to an operating system from the firmware device only upon completion of the initialization process, in response to an initialization request being received from an application program executing within the operating system, wherein the memory is a Static Random Access Memory (SRAM).

18. An apparatus to provide an interface between an operating system and a memory, comprising:

a firmware device, to hold settings for the memory, and send a completion signal to the operating system only after an initialization of the memory has been completed in response to an initialization request for a range of memory addresses being received from an application program executing within the operating system; and a memory controller to initialize the range of the memory addresses to a configurable value after receiving the initialization request from the firmware device, and send the completion signal to the firmware device after the initialization is completed, wherein the firmware device is physically separate from the memory controller and the memory, wherein the settings include a memory address mapping.

19. The apparatus of claim 18, wherein the firmware device has an Extensible Firmware Interface (EFI) format.

20. An apparatus to provide an interface between an operating system and a memory, comprising:

a firmware device, to hold settings for the memory, and send a completion signal to the operating system only after an initialization of the memory has been completed in response to an initialization request for a range of memory addresses being received from an application program executing within the operating system; and a memory controller to initialize the range of the memory addresses to a configurable value after receiving the initialization request from the firmware device, and send the completion signal to the firmware device after the initialization is completed, wherein the firmware device is physically separate from the memory controller and the memory, wherein the memory is a Dynamic Random Access Memory (DRAM).

21. An apparatus to provide an interface between an operating system and a memory, comprising:

a firmware device, to hold settings for the memory, and send a completion signal to the operating system only after an initialization of the memory has been completed in response to an initialization request for a range of memory addresses being received from an application program executing within the operating system; and a memory controller to initialize the range of the memory addresses to a configurable value after receiving the initialization request from the firmware device, and send the completion signal to the firmware device after the initialization is completed, wherein the firmware device is physically separate from the memory controller and the memory, wherein the memory is a Static Random Access Memory (SRAM).

* * * * *